US010165887B2

(12) United States Patent
Lemberg et al.

(10) Patent No.: US 10,165,887 B2
(45) Date of Patent: Jan. 1, 2019

(54) COOKING DEVICE UTILIZING INGREDIENT CARTRIDGE ASSEMBLY

(71) Applicant: FOODSTAR LLC, Jericho, NY (US)

(72) Inventors: Yuriy Lemberg, Jericho, NY (US); Mikhail Lemberg, Jericho, NY (US); Farit Unusov, Moscow (RU)

(73) Assignee: Foodstar LLC, Jericho, NY (US)

( * ) Notice: Subject to any disclaimer, the term of this patent is extended or adjusted under 35 U.S.C. 154(b) by 429 days.

(21) Appl. No.: 14/949,281

(22) Filed: Nov. 23, 2015

(65) Prior Publication Data

US 2017/0143151 A1    May 25, 2017

(51) Int. Cl.
| | | |
|---|---|---|
| *A47J 27/00* | (2006.01) | |
| *A23L 1/01* | (2006.01) | |
| *A47J 27/12* | (2006.01) | |
| *A23L 5/10* | (2016.01) | |
| *A23P 30/00* | (2016.01) | |
| *B65D 85/804* | (2006.01) | |

(52) U.S. Cl.
CPC ........... *A47J 27/002* (2013.01); *A23L 1/0128* (2013.01); *A23L 5/10* (2016.08); *A23L 5/13* (2016.08); *A23P 30/00* (2016.08); *A47J 27/12* (2013.01); *A23V 2002/00* (2013.01); *A47J 27/00* (2013.01); *B65D 85/804* (2013.01); *B65D 2203/10* (2013.01)

(58) Field of Classification Search
CPC ........... A47J 27/00; A47J 27/12; G07F 11/66; B65D 83/0805
USPC .......... 99/334, 326, 348, 357, 484; 221/290, 221/302, 32
See application file for complete search history.

(56) References Cited

U.S. PATENT DOCUMENTS

| | | | | |
|---|---|---|---|---|
| 5,029,520 A | * | 7/1991 | Okada ................. | A47J 37/1228 221/150 HC |
| 5,168,795 A | * | 12/1992 | Okada ................. | A47J 37/1228 221/150 A |
| 5,400,699 A | * | 3/1995 | Cailbault ............ | A47J 37/1228 221/150 A |
| 6,383,542 B1 | * | 5/2002 | Khodor .................. | G07F 9/105 221/1 |
| 6,539,841 B1 | * | 4/2003 | Spasovski ............. | A47J 27/004 426/115 |

(Continued)

*Primary Examiner* — Reginald Alexander
(74) *Attorney, Agent, or Firm* — Moritt Hock & Hamroff LLP; Bret P. Shapiro

(57) ABSTRACT

Technologies are described for devices and methods to utilize an ingredient cartridge assembly. The devices may comprise a cooking pot, a heat source, a loading track, a propulsion system, a loading compartment, and a controller. The loading compartment may be located along the loading track. The controller may be in communication with the heat source and the propulsion system. The propulsion system may be configured to receive an ingredient cartridge assembly including a cartridge. A protective film on the cartridge may be contacted with the propulsion system. The propulsion system may pull the protective film to peel the protective film from the cartridge and slide the cartridge along the loading track towards the loading compartment. An ingredient inside of the cartridge may deposit into the loading compartment as the cartridge passes over the loading compartment. The loading compartment may be configured to deposit the ingredient into the cooking pot.

10 Claims, 4 Drawing Sheets

(56) References Cited

U.S. PATENT DOCUMENTS

2016/0067866 A1* 3/2016 Sekar .................. B25J 11/0045
99/348
2016/0379434 A1* 12/2016 Huang ................ G07F 17/0078
99/334

* cited by examiner

COOKING DEVICE UTILIZING INGREDIENT CARTRIDGE ASSEMBLY

BACKGROUND

A cooking device may be utilized to prepare food. A cooking device may receive ingredients and may provide heat to the ingredients in order to produce a cooked item. Heating may be provided by the cooking device converting a power source into a heat source, such as by burning fuel or converting electrical energy to produce heat.

SUMMARY

In some examples cooking devices effective to utilize an ingredient cartridge assembly are described. The cooking devices may comprise a cooking pot, a heat source, a cartridge loading track, a cartridge propulsion system, an ingredient loading compartment, and a controller. The ingredient loading compartment may be located along the cartridge loading track. The controller may be in communication with the heat source and the cartridge propulsion system. The cartridge propulsion system may be configured to receive an ingredient cartridge assembly. The ingredient cartridge assembly may include a cartridge. A protective film on the cartridge may be contacted with the cartridge propulsion system. The cartridge propulsion system may turn and pull the protective film to peel off the protective film from the cartridge and to slide the cartridge along the cartridge loading track towards the ingredient loading compartment. An ingredient inside of the cartridge may deposit into the ingredient loading compartment as the cartridge passes over the ingredient loading compartment. The ingredient loading compartment may be configured to deposit the ingredient into the cooking pot.

In some examples, methods for cooking are described. The methods may comprise receiving an ingredient cartridge assembly at a cartridge propulsion system. The ingredient cartridge assembly may include a cartridge. A protective film on the cartridge may be contacted with the cartridge propulsion system. The methods may comprise receiving cooking instructions. The methods may comprise executing the cooking instructions by a controller. The executing of the cooking instruction by the controller may include controlling the cartridge propulsion system to turn and pull the protective film to peel off the protective film from the cartridge and to slide the cartridge along a cartridge loading track towards an ingredient loading compartment. At least one ingredient inside of the cartridge may deposit into the ingredient loading compartment as the cartridge passes over the ingredient loading compartment.

In some examples, an ingredient cartridge is described. The ingredient cartridge may comprise a tray with an open side. The ingredient cartridge may comprise at least one ingredient contained within the tray. The ingredient cartridge may comprise a protective film. The protective film may seal the tray along an edge of the open side of the tray. The protective film may transport the ingredient cartridge when received by a cooking device. The protective film may be removable from the tray by pealing the protective film away from the tray.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
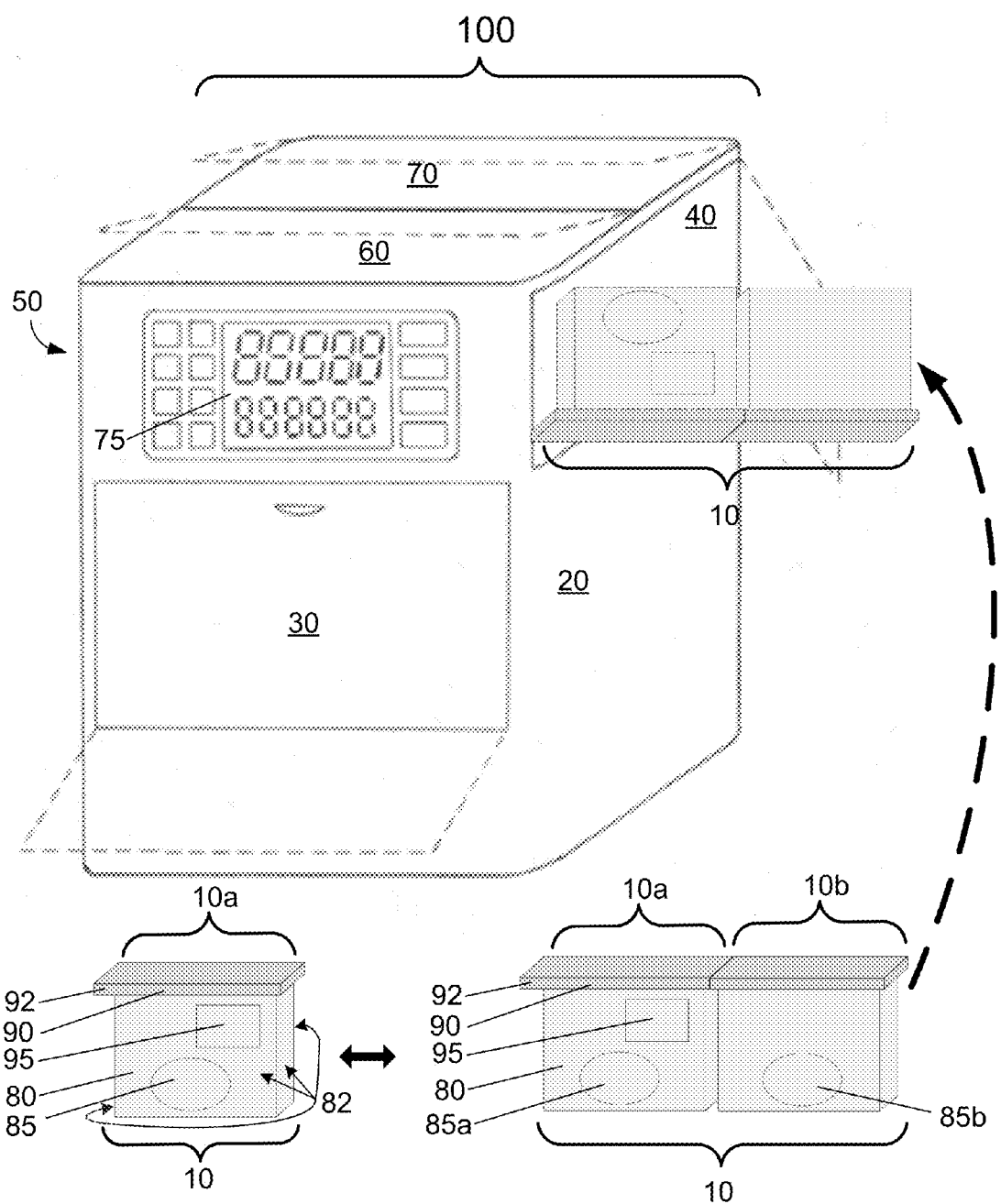
FIG. 1 is a front profile of a cooking device that can utilize an ingredient cartridge assembly.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 is a front profile of cooking device 100 with an ingredient cartridge 10, arranged in accordance with at least some embodiments presented herein. As discussed in more detail below, ingredient cartridge 10 may be loaded into cooking device 100 and provide ingredients to cooking device 100. Cooking device 100 may utilize ingredients in ingredient cartridge 10 to prepare cooked food.

Device 100 may include an outer casing 20. Outer casing 20 may include plastic, metal, ceramic, composite, or any combination of material. Outer casing 20 may protect internal components of cooking device 100 as well as insulate and prevent exposure of cooking ingredients or prepared food to the environment outside of cooking device 100. Outer casing 20 may include access panels, allowing access through outer casing 20 to internal components within cooking device 100. Outer casing 20 may include a front access panel 30 on a front side of cooking device 100. Access panel 30 may provide access to internal components of cooking device 100. Outer casing 20 may include side access panel 40 on a first side of cooking device 100 adjacent to the front side of cooking device 100. Outer casing 20 may include side access panel 50 on a second side of cooking device 100, opposite the first side of cooking device 100 and adjacent to the front side of cooking device 100. Side access panels 40 and 50 may provide access for ingredient cartridge 10 to internal components of cooking device 100. Outer casing 20 may include a first top access panel 60, proximate to the front of cooking device 100 and a second top access panel 70, proximate to the back of cooking device 100. Top access panels 60 and 70 may provide access to internal components of cooking device 100. Cooking device 100 may include a control panel 75. Control panel 75 may be secured to outer casing 20 on the front side of cooking device 100.

Ingredient cartridge assembly 10 may include ingredients 85 used to prepare a food item or a meal. Ingredient cartridge assembly 10 may include one cartridge 10a or multiple cartridges 10a, 10b depending upon the item to be prepared. Ingredient cartridge assembly 10 may include cartridges arranged in order of the ingredients necessary for preparing a recipe. Ingredient cartridge assembly 10 may include multiple cartridges 10a, 10b of different sizes. Cartridges 10a, 10b may be sized based on an ingredient amount required and storage requirements for an ingredient. Each cartridge 10a may include a tray 80, ingredient 85, a protective film 90, and a label 95. Tray 80 may be malleable or rigid. Tray 80 may include a plastic tray. Tray 80 may be a thermoform tray. For example, tray 80 may include polypropylene (PP) with a moisture barrier coating of polyethylene terephthalate (PET). Tray 80 may be rectangular in cross section with a flat base and four connected walls 82 extending up from each of four ends of the rectangular base to form an open box. Each of the four walls 82 may be connected to two adjacent walls 82 at each of the four corners of the rectangular flat base. The four walls 82 and the flat base may form tray 80 with a base side closed and top edges of the four walls 82 forming an opening at the top end of tray 80. Tray 80 may include an adhesive layer at the top edges of four walls 82 forming an opening at the top end of tray 80. An ingredient 85, or combination of more than one ingredient 85 may be disposed within tray 80, and may be disposed upon the rectangular base and within the walls 82.

A protective film 90 may be secured to the top edges of the four walls 82 forming the opening at the top end of tray 80. Protective film 90, may be secured to the top edges of the four walls 82 forming the opening at the top end of tray 80 by the adhesive layer at the top edges of four walls 82 of tray 80. Protective film 90, being secured to the top edges of the four walls 82 forming the opening at the top end of tray 80 may seal ingredient 85 within ingredient cartridge 10a. Protective film 90, secured to the top edges of the four walls 82 of tray 80, may include a protruding tab 92 of protective film 90. Protruding tab 92 may extend outward from one of the top edges of walls 82 of tray 80 of a first cartridge 10a of ingredient cartridge assembly 10. Ingredient cartridge assembly 10 may include multiple cartridges 10a, 10b. Protective film 90 may be a continuous strip for an entire length of ingredient cartridge assembly 10 and may be secured to the top edges of walls 82 of cartridge 10a and the top edges of walls 82 of cartridge 10b. Cartridge 10a and cartridge 10b may include different ingredients 85 such as meats, grains, pastas, spices, sugar, flour, etc. Each cartridge 10a and 10b may include a singular ingredient 85a and 85b respectively, or each cartridge 10a, 10b may include a combination of ingredients 85a and 85b based upon a recipe to prepare the intended food or meal. Ingredients 85a and 85b may be ordered in ingredient cartridge assemble 10 in order of each ingredients requirement for a recipe.

Protective film 90 may include a flexible tape. Protective film 90 may be of various thickness, depending on ingredient 85 type and an intended shelf life of ingredient cartridge assembly 10. Protective film 90 may be secured to the top edges of walls 82 of tray 80 by an adhesive, heat sealing or another method. Protective film 90 may protect ingredient 85 contained within tray 80. Ingredient 85 may be packaged and sealed within tray 80 with protective film 90 by modified atmosphere packaging (MAP). MAP may change a composition of atmosphere air within tray 80 from standard atmosphere air and may improve shelf life. Protective film 90 may be removable from tray 80 by pealing protective film 90 away from tray 80. Protective film 90 may include a pre-determined opening pattern. A pre-determined opening pattern of protective film 90 may leave no protective film residue when protective film 90 is peeled away from tray 80. Ingredient 85 contained within tray 80 may be exposed when protective film 90 is removed or peeled away from tray 80. Ingredient cartridge assembly 10 may include a label 95 affixed to tray 80. Label 95 may include cooking instructions. As discussed in more detail below, ingredient cartridge assembly 10 may be loaded into cooking device 100 through side access panel 40 and provide ingredients and cooking instructions to cooking device 100 to prepare cooked food.

Figure 2:
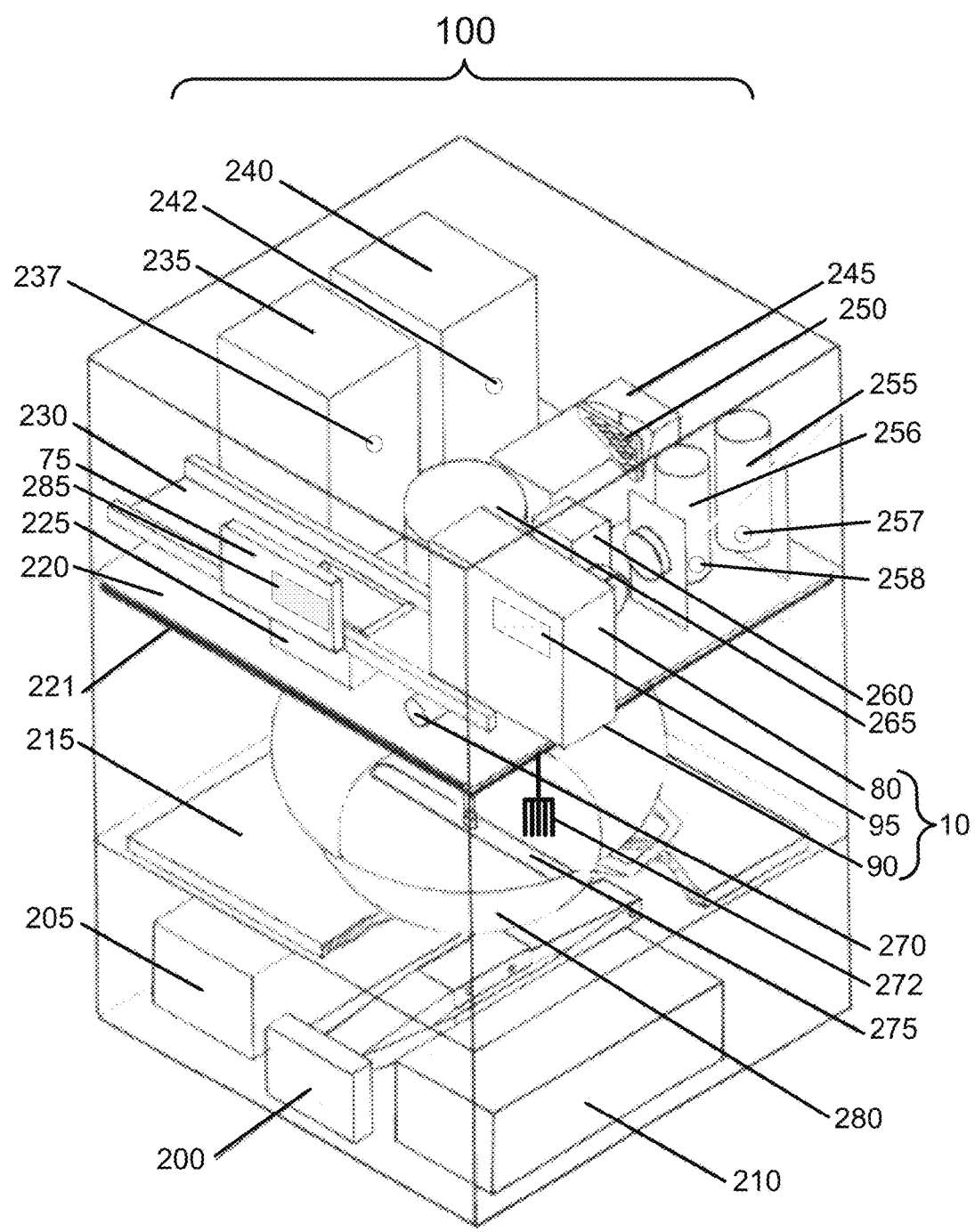
FIG. 2 is a front/side/top perspective blow up view of components of a cooking device that can utilize an ingredient cartridge assembly.

FIG. 2 is a front/side/top perspective blow up view of components of a cooking device that can utilize an ingredient cartridge, arranged in accordance with at least some embodiments presented herein. Those components in FIG. 2 that are labeled identically to components of FIG. 1 will not be described again for the purposes of clarity.

Cooking device 100 may include a lift 200, a power supply 205, a controller 210, a heating element 215, a mounting frame 220, a protective barrier 221, an ingredient loading compartment 225, a cartridge loading track 230, a refillable reservoir 235, a refillable reservoir 240, an air exhaust system 245, an oil filter 250, spice reservoirs 255, 256, a stirrer 260, a gear motor 265, an ingredient cartridge propulsion system 270, a mixing fork 272, a mixing blade 275, a cooking pot 280, and a scanner 285.

Power supply 205 may receive electric energy, such as electricity from a standard electrical outlet, and may supply electrical energy in the form of a current and voltage to components of cooking device 100. Components of cooking device 100 which may receive electrical energy from power supply 205 may include lift 205, controller 210, heating element 215, control panel 75, exhaust system 245, stirrer 260, gear motor 265, ingredient cartridge propulsion system 270, and scanner 285.

Mounting frame 220 may be within cooking device 100 and may provide a mounting frame for components including ingredient loading compartment 225, cartridge loading track 230, refillable reservoir 235, refillable reservoir 240, air exhaust system 245, spice reservoirs 255, 256, stirrer 260, gear motor 265, and ingredient cartridge propulsion system 270. Protective barrier 221 may be replaceable and may protect device 100 components from oil, vapor, and odor contamination and prolong a service life of device 100. Protective barrier 221 may be attachable to a bottom of mounting frame 220. Protective barrier 221 may be adjacent to a top opening of cooking pot 280. As described in more detail below, protective barrier 221 may prevent ingredients in cooking pot 280 from emitting out from cooking pot 280 during the cooking process when cooking pot 280 is raised to contact protective barrier 221. For example, protective barrier 221 may prevent food debris, liquids, grease, and vapors in cooking pot 280 from emitting out from cooking pot 280 and fouling components of cooking device 100.

Controller 210 may include a processor and may be in communication with scanner 285. Scanner 285 may scan label 95 of ingredient cartridge 10 and data related to cooking instructions for ingredient cartridge 10. For example, scanner 285 may be a barcode or quick response (QR) scanner and may scan a bar code or QR code printed on label 95. Scanner 285 may be a scanner able to detect a radio frequency identification (RFID) chip on label 96. Scanner 285 may relay data scanned from ingredient cartridge 10 to controller 210. Controller 210 may receive data from scanner 285. Data received from scanner 285 may include cooking instructions. Controller 210 may execute cooking instructions from data received from scanner 285.

Data received from scanner 285 may include data related to locating cooking instructions for ingredient cartridge 10. For example, scanner 285 may scan a bar code or QR code on ingredient cartridge 10. The QR code may include data for a web address where cooking instructions associated with ingredient cartridge 10 may be located. Controller 210 may be in communication with a network, such as the Internet by Wi-Fi, Bluetooth, or direct connection, and may be configured to download cooking instructions in response to receiving scanned data from scanner 285 including data related to locating cooking instructions. Controller 210 may execute cooking instructions received in response to scanning label 95. Controller 210 may control components of cooking device 100 to execute cooking instructions.

Controller 210 may be in configured to receive operating instructions from a device over a network. For example, a user of cooking device 100 may have a mobile device application which may communicate with processor 210 and cooking device 100 over a network. A user may be able to control a time cooking device 100 starts to prepare food through a communication from a mobile device over the network.

Refillable reservoirs 235, 240 and spice reservoirs 255, 256 may include control valves 237, 242, 257 and 258 respectively to allow ingredients within refillable reservoirs 235, 240 and spice reservoirs 255, 256 to flow or drop into cooking pot 280. Controller 210 may be in communication with control valves 237, 242, 257, and 258. Controller 210 may control an amount of ingredient deposited into cooking pot 280 from refillable reservoirs 235, 240 and spice reservoirs 255, 256 by controlling of control valves 237, 242, 257, and 258. Refillable reservoirs 235, 240 may include water and cooking oil. Refillable reservoirs 235, 240 may be refilled by a user of cooking device 100. Spice reservoirs 255, 256 may include cooking spices including salt, pepper, cumin, curry, garlic powder, etc. Spice reservoirs 255, 256 may be recipe specific and may not be refillable. Controller 210 may execute cooking instructions received in response to scanning label 95 and may control control valves 237, 242, 257, and 258 to open or close. Ingredients from refillable reservoirs 235, 240 and spice reservoirs 255, 256 may be deposited into cooking pot 280 at one time or at various times based on execution of cooking instructions by controller 210.

Lift 200 may be in communication with controller 210 and attached to power supply 205, heating element 215, and cooking pot 280. Heating element 215 and cooking pot 280 may be attached to a top of lift 200. Controller 210 may, by executing cooking instructions, control lift 200 to position cooking pot 280 in relation to protective barrier 221. For example, controller 210 may control lift 200 to raise heating element 215 and cooking pot 280 to contact protective barrier 221 to insure a seal between cooking pot 280 and protective barrier 221. Contact causing a seal between cooking pot 280 and protective barrier 221 may prevent spillage, or emission of oil, vapors, or odors while cooking ingredients in cooking pot 280. Controller 210, executing cooking instructions, may control a temperature of heating element 215 throughout cooking process to adjust a cooking temperature within cooking pot 280. In another example, controller 210 may control lift 200 to lower heating element 215 and cooking pot 280 away from protective barrier 221. Lift 200, lowering cooking pot 280 away from protective barrier 221, may allow cooking pot 280 to be removable from cooking device 100.

Controller 210 may, by executing cooking instructions, control gear motor 265 and stirrer 260. A mixing blade 275 may be attached to gear motor 265 and may be located within cooking pot 280. A mixing fork 272 may be attached to stirrer 260 and may be located within cooking pot 280. Controller 210 may, by executing cooking instructions, control gear motor 265, stirrer 260, mixing blade 275 and mixing fork 272 to mix/puree/blend ingredients within cooking pot 280.

Figure 3A:
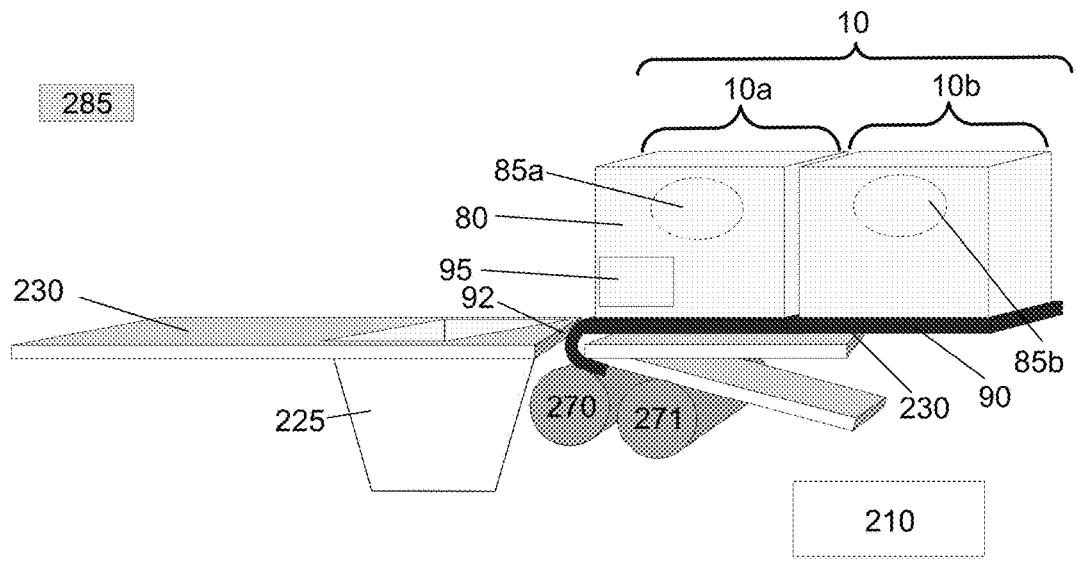
FIG. 3a is a side perspective view of an ingredient cartridge assembly loaded onto a cartridge loading track of the cooking device.
Figure 3B:
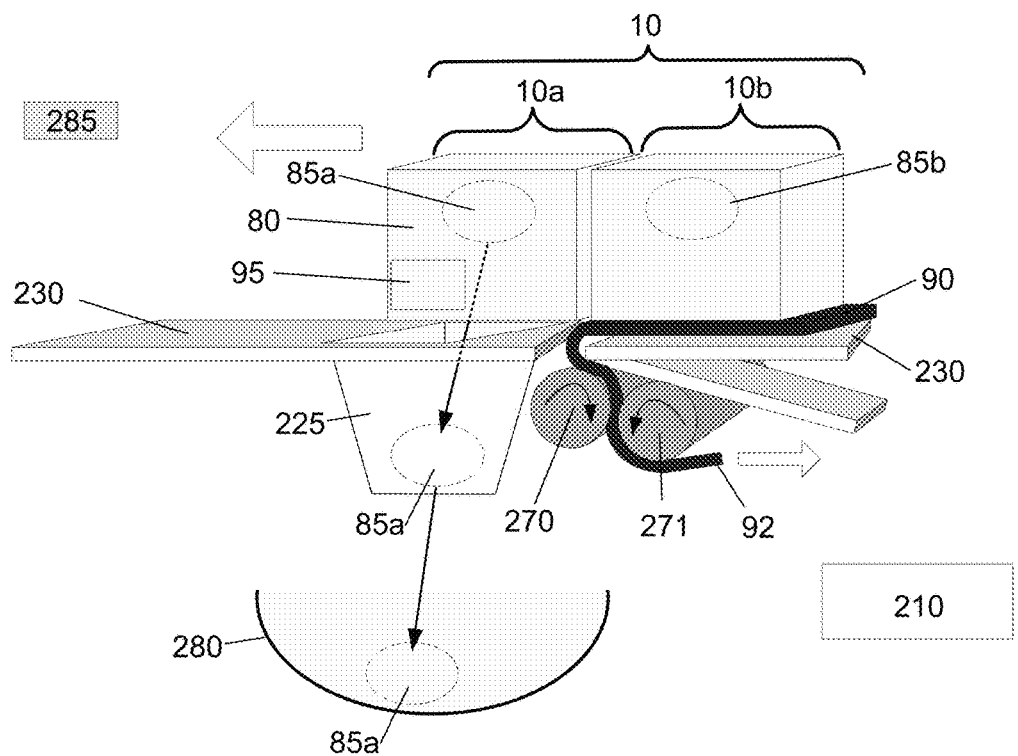
FIG. 3b is a side perspective view of an ingredient cartridge assembly moving along the cartridge loading track of the cooking device.

FIGS. 3a and 3b are a side perspective views of an ingredient cartridge assembly loaded onto the cartridge loading track, arranged in accordance with at least some embodiments presented herein. Those components in FIGS. 3a and 3b that are labeled identically to components of FIGS. 1-2 will not be described again for the purposes of clarity. As discussed in more detail below, an ingredient cartridge assembly 10 may be loaded onto cartridge loading track 230 such that ingredient cartridge assembly 10 may be transported by protective film 90 as protective film 90 is peeled from tray 80.

At FIG. 3a, ingredient cartridge assembly 10 may be placed on cartridge loading track 230 with protective film 90 in contact with cartridge loading track 230. Protruding tab 92 may protrude from a leading edge of cartridge 10a of ingredient cartridge assembly 10 and may be positioned to contact ingredient cartridge propulsion system 270. Cartridge propulsion system 270 may include a locking mechanism 271 which may prevent protective film 90 in cartridge propulsion system 270 from slipping when cartridge propulsion system 270 turns. Scanner 285 may scan label 95 of ingredient cartridge assembly 10 and data related to cooking instructions for ingredient cartridge assembly 10. Controller 210 may receive data from scanner 285. Data received from scanner 285 may include cooking instructions. Controller 210 may execute cooking instructions from data received from scanner 285. Controller 210 may, by executing cooking instructions scanned from label 95, control ingredient cartridge propulsion system 270 to turn and transport ingredient cartridge assembly 10 along cartridge loading track 230.

At FIG. 3b, ingredient cartridge propulsion system 270 may turn, upon controller 210 executing cooking instructions scanned from label 95. Controller 210, may control cartridge propulsion system to turn a set amount of turns as indicated by the cooking instructions. Ingredient cartridge propulsion system 270 turning may in turn pull protective film protruding tab 92 and pull ingredient cartridge assembly 10 towards ingredient loading compartment 225.

Ingredient cartridge propulsion system 270 may turn and pull protruding tab 92. Ingredient cartridge propulsion system 270 may, by turning and pulling protruding tab 92, peel protective film 90 off of leading cartridge 10a while transporting cartridge 10a without protective film 90 towards ingredient loading compartment 225.

Cartridge 10a, being pulled by protective film 90 by ingredient cartridge propulsion system 270 may slide along cartridge loading track 230 towards ingredient loading compartment 225. Ingredient 85a inside of cartridge 10a may be exposed by peeling of protective film 90 as cartridge 10a is pulled along cartridge loading track 230. Cartridge loading track 230 may include an opening in cartridge loading track 230 at ingredient loading compartment 225. Ingredient 85a, exposed by peeling of protective film 90 may be deposited into ingredient loading compartment 225 by gravity as cartridge 10a slides along cartridge loading track 230. Controller 210, may control cartridge propulsion system to turn a set amount of turns to pull cartridge 10a along cartridge loading track 230 and deposit ingredient 85a into ingredient loading compartment 225. Controller 210 may control ingredient loading compartment 225 to deposit ingredient 85a into cooking pot 280.

Controller 210 may control ingredient cartridge propulsion system 270 so as to deposit ingredient 85a into ingredient loading compartment 225 and subsequently into cooking pot 280 at a designated time based upon controller 210 execution of cooking instructions. Controller 210, by execution cooking instructions, may control cartridge propulsion system 270 to turn for a predetermined amount of time or number of turns based upon cooking instructions as cartridges 10a, 10b may be of different sizes. Controller 210 may control ingredient cartridge propulsion system 270 so as to further turn and pull protective film 90 to transport cartridge 10b and deposit ingredient 85b into ingredient loading compartment 225. Controller 210 may subsequently control ingredient loading compartment 225 to deposit ingredient 85b into cooking pot 280 at a designated time based upon controller 210 execution of cooking instructions. Controller 210 may, by executing cooking instructions, deposit ingredients 85a and 85b into cooking pot at designated times to prepare cooked food.

In an example, ingredient cartridge assembly 10 may include multiple cartridges, 10a, 10b . . . 10n. Cartridges 10a, 10b . . . 10n may be different sizes and may be sized based on an ingredient 85a, 85b . . . 85n amount required and storage requirements for ingredient 85a, 85b . . . 85n. Controller 210, may continue to control ingredient cartridge propulsion system 270 to turn a designated number of turns and pull protective film 90 so as to transport cartridges 10a, 10b, . . . 10n towards ingredient loading compartment 225 at designated times and to deposit ingredients 85a, 85b, . . . 85n into ingredient loading compartment 225. Ingredients may be deposited into cooking pot 280 at one time or at various times based on controller 210 execution of cooking instructions.

In an example, an ingredient cartridge assembly 10 for making a meal may be placed on cartridge loading track 230 with protective film 90 in contact with cartridge loading track 230. Protruding tab 92 may be positioned to contact ingredient cartridge propulsion system 270. Scanner 285 may scan label 95 of ingredient cartridge assembly 10 and send data related to cooking instructions for ingredient cartridge assembly 10 to controller 210. Controller 210, executing cooking instructions, may control control valve 237 on refillable reservoir 235 to deposit a set amount of water into cooking pot 280. Controller 210, executing cooking instructions, may control control valve 257 on spice reservoir 255 to deposit a set amount of salt into cooking pot 280. Controller 210, executing cooking instructions, may control lift 200 and heating element 215 in order to boil water in cooking pot 280. Controller 210, executing cooking instructions, may control gear motor 265 to stir ingredients in cooking pot 280 with stirrer 260. Controller 210, executing cooking instructions, may control ingredient cartridge propulsion system 270 to turn ten turns in order to pull or peel off protective film 90 and to transport cartridge 10a towards ingredient loading compartment 225 at a time determined by the cooking instructions. A first ingredient 85a within cartridge 10a may be dried rice, and may be deposited into ingredient loading compartment 225. Controller 210, executing cooking instructions, may control ingredient cartridge propulsion system 270 to stop turning after ten turns so as to only deposit ingredient 10a into ingredient loading compartment 225. Controller 210, executing cooking instructions, may deposit ingredient 85a into cooking pot 280. Controller 210, executing cooking instructions, may control lift 200 and heating element 215 in order to simmer ingredients in cooking pot 280.

Controller 210, executing cooking instructions, may control ingredient cartridge propulsion system 270 to turn five times in order to pull or peel off protective film 90 and to transport cartridge 10b towards ingredient loading compartment 225 at a time determined by the cooking instructions. Ingredient 85b within cartridge 10b may be seasonings, and may be deposited into ingredient loading compartment 225. Controller 210, executing cooking instructions, may control ingredient cartridge propulsion system 270 to stop turning after five turns so as to only deposit ingredient 10b into ingredient loading compartment 225. Controller 210, executing cooking instructions, may deposit ingredient 85b into cooking pot. Controller 210, executing cooking instructions, may control gear motor to stop stirring ingredients in cooking pot 280 with blade 275. Controller 210, executing cooking instructions, may control heating element 215 in order to stop heating ingredients in cooking pot 280.

Figure 4:
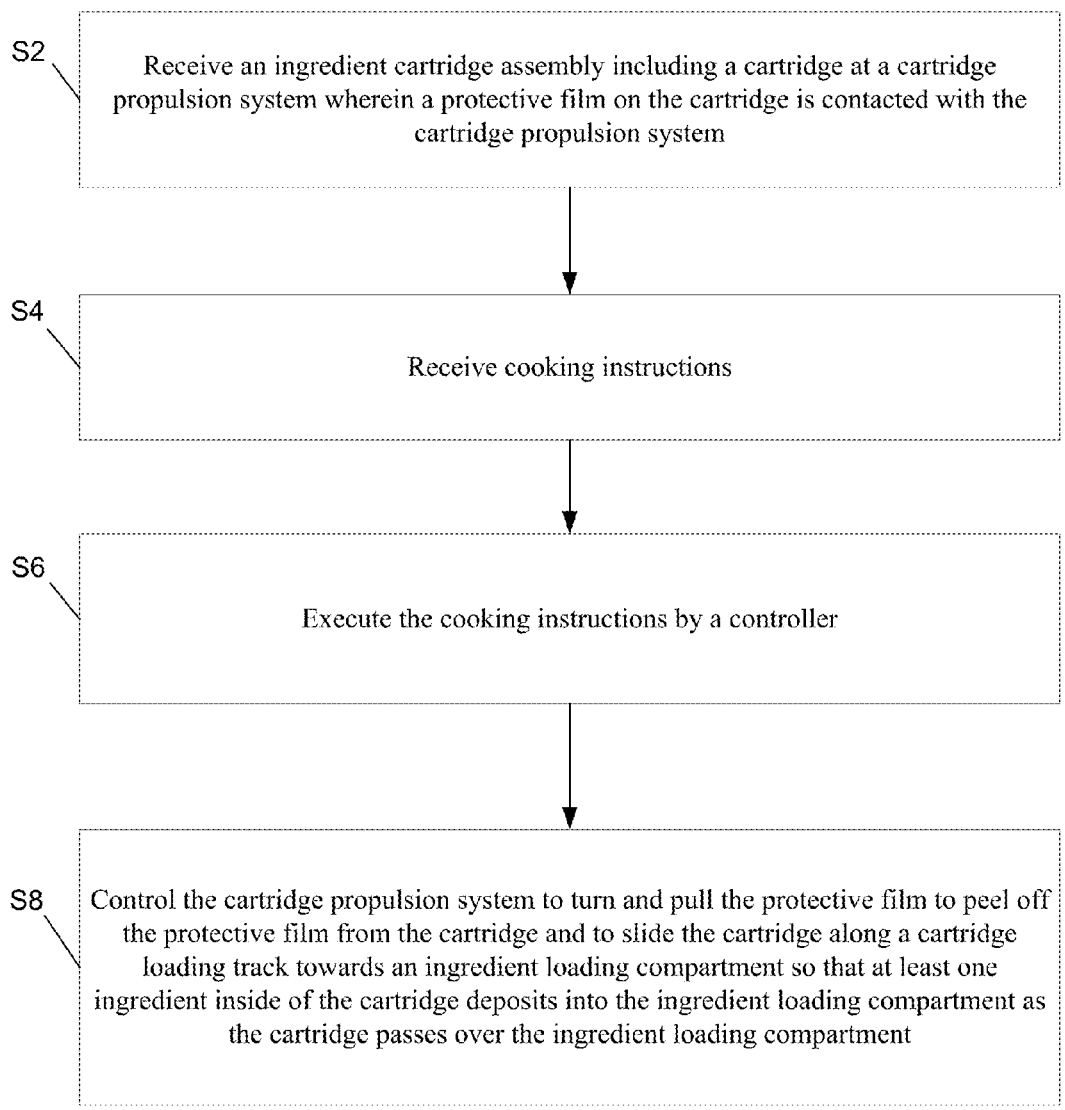
FIG. 4 illustrates a flow diagram of an example process for cooking food utilizing an ingredient cartridge assembly.

FIG. 4 illustrates a flow diagram of an example process for cooking food utilizing an ingredient cartridge assembly, arranged in accordance with at least some embodiments presented herein. The process in FIG. 4 could be implemented using, for example, device 100 discussed above and may be used to cook food. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive an ingredient cartridge assembly including a cartridge at a cartridge propulsion system wherein a protective film on the cartridge is contacted with the cartridge propulsion system." At block S2, a cartridge propulsion system of a cooking device may receive an ingredient cartridge assembly. The ingredient cartridge assembly may include a cartridge. A protective film on the cartridge may be contacted with the cartridge propulsion system.

Processing may continue from block S2 to block S4, "Receive cooking instructions." At block S4, the cooking device may receive cooking instructions. A scanner may scan the ingredient cartridge assembly for the cooking instructions. Cooking instructions on the ingredient cartridge assembly may be in the form of a barcode, a quick response (QR) code or a radio frequency identification (RFID) chip.

Processing may continue from block S4 to block S6, "Execute the cooking instructions by a controller." At block S6, a processor of the cooking device may execute the cooking instructions to prepare cooked food. Cooking instructions may include instructions for depositing of ingredients, mixing times and speeds, and cooking times and temperatures.

Processing may continue from block S6 to block S8, "Control the cartridge propulsion system to turn and pull the protective film to peel off the protective film from the cartridge and to slide the cartridge along a cartridge loading track towards an ingredient loading compartment so that at least one ingredient inside of the cartridge deposits into the ingredient loading compartment as the cartridge passes over the ingredient loading compartment." At block S8, the processor may control the cartridge propulsion system to turn. Turning the propulsion system may pull the protective film and peel off the protective film from the cartridge. Turning the propulsion system and pulling the protective film from the cartridge may cause the cartridge to slide along a cartridge loading track towards an ingredient loading compartment. At least one ingredient inside of the cartridge may deposit into the ingredient loading compartment as the cartridge passes over the ingredient loading compartment.

A system in accordance with the present disclosure may enable a user to prepare and cook food with minimal effort. Ingredient cartridges may increase a user's convenience as they are pre-filled and a user does not have to prepare or measure ingredients. Food may be prepared step by step and have a better taste. There may be minimal waste as all ingredients are premeasured, and in proper amounts for a recipe. Food prepared by the disclosed method may be fresh and not frozen, and may be of a higher quality. A user may be able to determine spice levels to be used, and spices may be stored in a separate reservoir. Ingredient reservoirs for water and cooking oil may be filled by a user so as to use specialty ingredients the user prefers.

A user may be able to communicate with the controller over a network and may be able to start the cooking device through a smartphone application. Cooking instructions may be stored on a network and updated to ensure a properly cooked meal.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cooking device effective to utilize an ingredient cartridge assembly, the cooking device comprising:
   a cooking pot;
   a heat source;
   a cartridge loading track;
   a cartridge propulsion system;
   an ingredient loading compartment located along the cartridge loading track;
   a gear motor;
   a mixing blade within the cooking pot, wherein the gear motor powers the mixing blade;
   a stirrer;
   a mixing fork within the cooking pot, wherein the stirrer powers the mixing fork; and
   a controller in communication with the heat source, the cartridge propulsion system, the gear motor, and the stirrer;
   wherein the cartridge propulsion system is configured to:
      receive an ingredient cartridge assembly including a cartridge, wherein a protective film on the cartridge is contacted with the cartridge propulsion system; and
      turn and pull the protective film to peel off the protective film from the cartridge and to slide the cartridge along the cartridge loading track towards the ingredient loading compartment so that an ingredient inside of the cartridge deposits into the ingredient loading compartment as the cartridge passes over the ingredient loading compartment, wherein the ingredient loading compartment is configured to deposit the ingredient into the cooking pot.

2. The device of claim 1, further comprising a lift in communication with the controller wherein the lift can raise and/or lower the cooking pot and heat source.

3. The device of claim 2, further comprising a protective barrier attached to a mounting frame and adjacent to a top opening of the cooking pot, wherein when the cooking pot is raised by the lift to contact the protective barrier, a seal is made between the cooking pot and the protective barrier such that the protective barrier prevents ingredients in the cooking pot from emitting out from the cooking pot.

4. The device of claim 1, further comprising:
   a first refillable reservoir for water including a first control valve; and
   a second refillable reservoir for cooking oil including a second control valve;
   wherein the first and second control valves are in communication with the controller.

5. The device of claim 1, further comprising at least one spice reservoir including a control valve wherein the control valve is in communication with the controller.

6. The device of claim 1, further comprising a scanner in communication with the controller, wherein the scanner is configured to scan the ingredient cartridge assembly for data related to cooking instructions.

7. The device of claim 6, wherein the data related to cooking instructions includes data in a bar code, a quick response (QR) code or an embedded chip.

8. The device of claim 6, wherein the controller is in communication with a network and the data related to cooking instructions includes data for a web address.

9. The device of claim 1, wherein the controller is in communication with a device over a network and the controller receives operating instructions from the device.

10. The device of claim 1, wherein the controller controls a temperature of the heat source.

* * * * *